United States Patent [19]

Bizzarro et al.

[11] 4,187,090

[45] Feb. 5, 1980

[54] HEAT EXCHANGER WATER COLLECTION SYSTEM

[75] Inventors: Peter Bizzarro, Bloomfield; John L. Warner, Simsbury, both of Conn.

[73] Assignee: United Technologies Corporation, Hartford, Conn.

[21] Appl. No.: 947,142

[22] Filed: Sep. 29, 1978

[51] Int. Cl.$^2$ ............................................. B01D 51/00
[52] U.S. Cl. ..................................... 55/269; 55/414; 55/447; 55/462; 165/111; 165/174
[58] Field of Search ............... 165/111, 112, 113, 110, 165/114, 174, 4; 55/269, 414, 447, 461, 462, 465

[56] References Cited

U.S. PATENT DOCUMENTS

| | | | |
|---|---|---|---|
| 3,525,390 | 8/1970 | Rothman | 165/166 |
| 3,797,565 | 3/1974 | Fernandes | 165/166 |
| 4,000,779 | 1/1977 | Irwin | 165/111 |

FOREIGN PATENT DOCUMENTS

| | | | |
|---|---|---|---|
| 463645 | 3/1930 | Fed. Rep. of Germany | 55/462 |
| 376005 | 7/1932 | United Kingdom | 55/269 |
| 389816 | 5/1972 | U.S.S.R. | 55/447 |

*Primary Examiner*—Bernard Nozick

*Attorney, Agent, or Firm*—Donald F. Bradley

[57] ABSTRACT

A water separator consisting of a baffle and scupper is inserted inside the outlet header of a regenerative heat exchanger for removing water from the air discharged therefrom. The cooled air which contains water droplets leaving the core of the heat exchanger is passed through a baffle constructed to provide a gradual restriction in area in order to increase flow velocity. Heavy droplets of water are separated by the sudden change in airflow direction through the baffle and header. The flow including the heavier centrifuged water droplets then impinge on the inside surface of the header to which the accumulated particles of water adhere and are accelerated by the airflow and the contour of the header toward a scupper located downstream of the baffle opening. The water is collected in the scupper cavity, collected in a drain well, and drained with the assistance of gravity and the resulting pressure differential across the drain port. The scupper contains holes or louvered slots whereby some air used to carry the water along the header inner surface may pass therethrough to combine with the remaining airflow in the duct through which the dried air is removed from the system.

10 Claims, 3 Drawing Figures

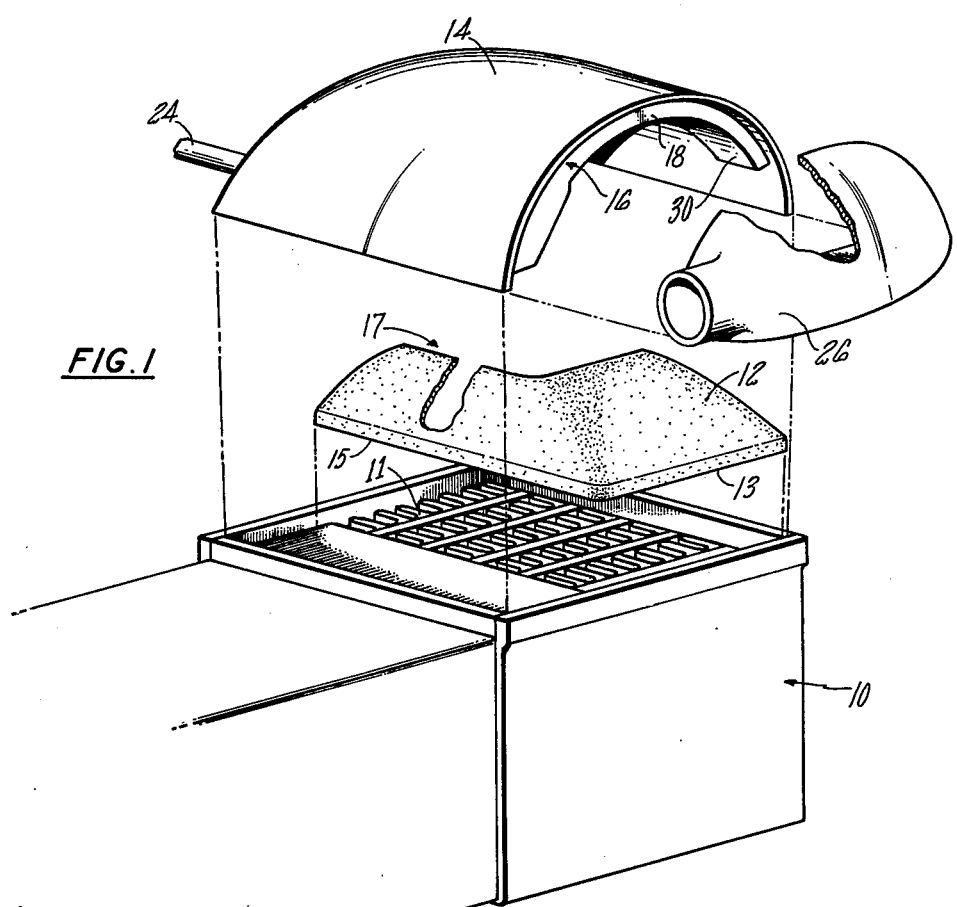
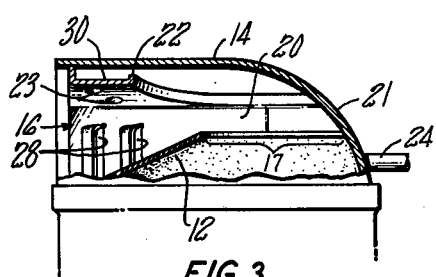
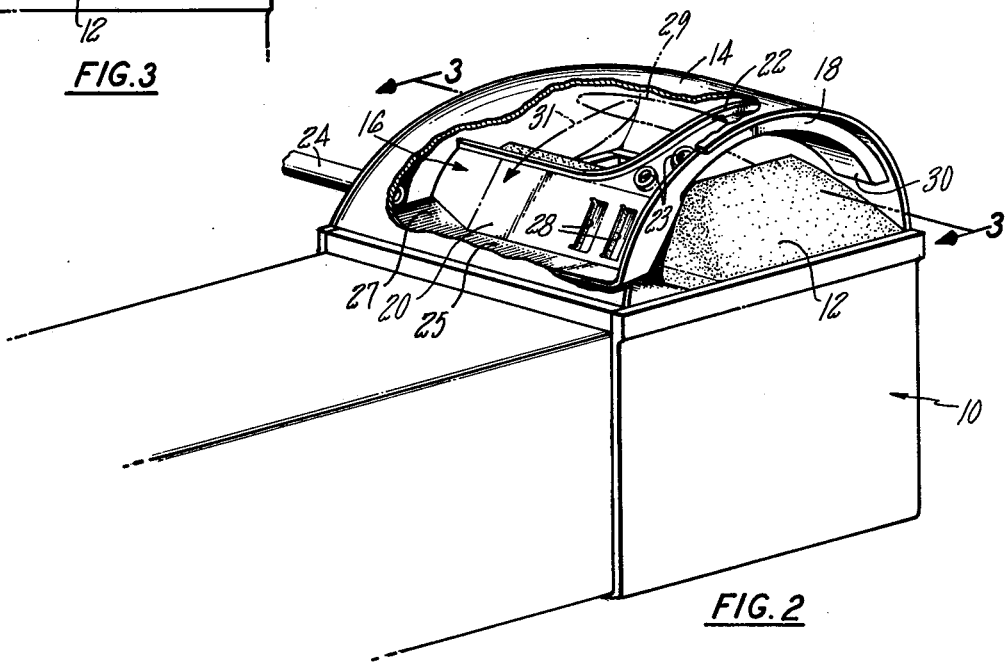

HEAT EXCHANGER WATER COLLECTION SYSTEM

BACKGROUND OF THE INVENTION

1. Field of the Invention

This invention relates to a water separation and collection system which is used at the outlet of a heat exchanger for collecting water entrained in the heat exchanger airflow and removing the water therefrom prior to the discharge of the air from the heat exchanger header duct. More particularly, this invention relates to the use of a baffle for accelerating the air emanating from the heat exchanger, the air containing water particles, and forcing the air-water mixture along the inside surface of a header wherein the water clings to the walls of the header and passes into a scupper from which the water is removed from the system by a drain. The resulting dry air is removed via a conventional duct. p 2. Description of the Prior Art Water separators or water collectors are well known in the art and take many shapes and forms. However, many such water collectors and separators take up significant space. Where space is limited it is necessary to provide a more convenient means for removing water particles such as those that are leaving a condensing heat exchanger core. The present invention overcomes the limitations of the prior art devices by providing an apparatus which is simple, and which is effective in removing the water particles discharged from the heat exchanger or other such devices where condensation takes place in a very limited space. Normally a header is used at the outlet end of heat exchangers to direct the outgoing air into the proper ducting means. The present invention is an improvement over the prior art in that the water separator-collector is entirely contained within the header and takes no additional space.

A particular feature of the present invention is the use of a baffle which causes the heavier water particles entrained in the air to impinge on and be accelerated along the inner surfaces of an outer header member into a scupper, the scupper containing provisions for permitting the air to pass therethrough while retaining the water particles which are then collected in the scupper and fed to a drain at the lowest point in the assembly.

It is therefore an object of this invention to provide an improved water collection system which is extremely small and compact.

A further object of this invention is a water collection system in which the air containing the water particles is accelerated about the inside of a header, with a scupper being used to collect the coadunated water particles.

Another object of this invention is the use of a scupper containing air holes or similar provisions therein which collect the water while at the same time permitting air to pass therethrough.

SUMMARY OF THE INVENTION

A significant problem exists with heat exchangers such as regenerative heat exchangers in that under certain conditions water droplets are formed in the hot air circuit on the outlet side of the core. Many systems have been used in the past to remove this water, primarily separate water separators or collectors downstream from the heat exchanger. The present invention involves a compact water separator-collector which is integral with the hot air outlet header, and which has minimum effect on heat exchanger performance. The water separator-collector forces the air emanating from the heat exchanger core through a baffle in order to accelerate the moisture-laden air. The baffle is arranged geometrically such that the moisture-laden air is forced in a direction such that it passes along the inside surface of a curved header mounted over the baffle. The increasing airflow velocity and changing airflow direction centrifuges heavy droplets of water, causing the water to cling to the inner surface of the header. The header directs the air-water mixture toward a scupper which is located downstream of the opening in the baffle and provides a cavity wherein the water will be collected. The air passes through openings in the scupper into a duct where the dried air is removed from the system. The water collected in the scupper follows the contours of the scupper and is drained from the system via a drain tube.

BRIEF DESCRIPTION OF THE DRAWING

FIG. 1 is an exploded perspective view of the baffle, header, core and outlet duct and their relationship to the heat exchanger.

FIG. 2 is an assembled perspective view, partly broken away, of the entire water separator of this invention.

FIG. 3 is a view along lines 3—3 of FIG. 2.

PREFERRED EMBODIMENT OF THE INVENTION

With respect to the FIGS., the heat exchanger 10 is representative of a standard plate-fin assembly in which heat is exchanged between warm and cool fluid mediums which pass through alternate layers of fins within the heat exchanger. There is nothing unique about the heat exchanger itself. The invention is not directed to any particular type of heat exchanger or device where condensation can take place, and the heat exchanger illustrated is merely by way of example.

The baffle 12 as shown in the Figures is preferably constructed of a single piece attached to the outlet portion of the core 11 of the heat exchanger 10 along the two outer edges 13 and 15 of the baffle. The baffle 12 may be attached in any conventional manner, and need not be limited to two edges, or to a rectangular shaped core. The purpose and construction of baffle 12 is to provide flow direction of the air-water mixture leaving the heat exchanger core 11. The baffle 12 is shaped and contoured such that it provides a gradual restriction in flow area to the air flowing from the heat exchanger core, and forces the air through a smaller opening shown by reference numeral 17 in one quadrant of the baffle outlet area thereby increasing its velocity. A header 14 is attached such as by welding about the heat exchanger core 11 and covers the baffle 12 whereby as a result of joining the header over the baffle 12 and to the core 11 an area is provided for passage of the air coming from the heat exchanger core 11 and through the opening 17 in the baffle 12 onto the inner surface of the header 14. By virtue of the two dimensional contour of the header as shown best at 21 in FIG. 3, the increasing velocity of the air and its changing direction centrifuges heavy droplets of water, causing the accumulated water to cling to the inner surface of the header 14. The baffle 12 may be constructed from any metallic or non-metallic material and need not be designed for heavy pressure loads. The header 14, however, must withstand higher pressures and is preferably constructed of a heavier material. By virtue of the particular contouring of the baffle and header combination, the air is constrained in a fashion which increases its velocity and directs the air with its moisture toward a scupper 16. The scupper fits within the inside of the header contour and provides a cavity or trough for the water droplets to be collected. The top of the scupper 16 is attached to the inner radius of the header 14 such as by welding and provides a wall portion 18 to prevent water from passing through the scupper so that the water is accumulated in the trough portion 27 of the scupper. The scupper 16 expands into an enlarged portion 20 which is attached at its lower end along the entire length of the core 11 and provides a passage into a drain cavity 25 for the accumulated water. The scupper 16 is relatively narrow adjacent the edge of the header and enlarges as it approaches the drain. The scupper extends along the length of the drain portion 25. The drain is at the lowest point of the assembly. A rolled or raised edge 22 is provided on the inside edge of the scupper to prevent the water accumulating therein from escaping due to local eddies produced by airflow through the scupper and header assembly. Holes 23 or similar openings are formed in the scupper, the openings preferably having rolled raised edges, to permit air to flow through the scupper cavity without water carry over. Inducing airflow through the scupper allows the water to be carried along the header surface and then trapped and collected and removed via the drain cavity 25 and a drain tube 24. A portion of the drain cavity 25 shown as 27 has a larger volume and is designed to accommodate the accumulated water prior to its being ducted out through the drain tube 24.

The airflow out of the baffle and into the scupper is shown by arrows 29 and 31 of FIG. 2. The portion of the air which does not pass through the openings in the scupper flows beneath the scupper into a common outlet duct 26 attached at one side of the header. Both the air passing through the openings in the scupper 16 and the remainder of the air from the outlet of the heat exchanger, pass through the outlet duct 26 into the next component which, for example, could be the turbine in a typical environmental control system for aircraft.

Preferably two holes 23 are provided in the scupper for airflow. However, in some circumstances it may be necessary to provide additional airflow openings as a function of the airflow volume and/or pressure and the size of the entire assembly. Either in addition to or in place of the holes 23 it may be desirable to use louvered-type openings as shown at 28 to remove additional air from the scupper. The important criterion is that provision be made for permitting air to escape from the scupper while at the same time permitting the moisture to flow to the lowest point of the scupper and be removed from the system via a drain. The drain tube 24 is attached to the header and is located at the lowest point of the scupper, accumulated water in drain cavity 25 passing therethrough.

While the invention has been described with respect to its preferred embodiment and best mode, it is apparent that changes may be made in the design and arrangement of components without departing from the scope of the invention as hereinafter claimed.

We claim:

1. A water collection and disposal system adapted to remove moisture from an airstream emanating from a heat exchanger core or the like comprising:

baffle means connected along a substantial portion of the outside edge of said core, said baffle means extending a short distance in the direction of the outlet airstream from said core and simultaneously being contoured toward a selected side portion of said core forming thereby a gradual area restriction to the entire outlet airstream from said core for increasing the velocity thereof;

a substantially semi-hemispherical header member having one open end with the remainder of said header completely covering said core and said baffle means, said header member being contoured in the area above which said airstream passes through the area restriction in said baffle means, said contour in said header member being such as to cause the airstream to be redirected within said header member away from the area of said header member where said airstream initially impinges, the increasing velocity and changing direction of said airstream centrifuging heavy droplets of water and causing the accumulated water to flow along the inner surface of said header member in the direction of airstream flow;

water collector means attached about the inside contour of said header member at the open end thereof, said water collector means extending a short distance below the inside of said header member and including a solid wall portion for blocking the airstream flow and also including a trough member connected to said solid wall portion for collecting the water in said airflow, said trough member being extended along the length of said header member and forming a drain cavity between said extended portion of said trough member and one side of said header member for accumulating the collected water;

a drain tube connected to said header adjacent said drain cavity for draining said collected water;

air passage means in said trough member;

and air outlet duct means attached to the open end of said header member.

2. A water collection system as in claim 1 and including a raised lip at the innermost end of said trough member for preventing the water in said trough member from escaping due to local airflow eddies.

3. A water collection system as in claim 1 in which said air passage means in said trough member includes a plurality of holes having raised edges surrounding said holes to permit only airflow therethrough.

4. A water collection system as in claim 1 in which said air passage means in said trough member includes louver-type openings.

5. A water collector for collecting and removing water contained in the outlet airflow from the core of a heat exchanger or the like comprising:

a substantially semi-hemispherical header member covering said heat exchanger core, said header member having an air outlet duct at one side thereof, said header member being contoured in two dimensions at the side opposite said outlet duct;

a baffle member within said header member surrounding and attached to a substantial portion of said core and configured to restrict the flow area of said airflow and direct said airflow toward the contoured portion of said header member whereby said airflow is redirected along the inside of said header member, said airflow being increased in velocity and any moisture therein being centrifuged and collected along the inner wall of said header;

water collection means including a scupper, said scupper having a first solid wall portion fixed about the inside radius of said header member at the duct side thereof and having a short radial depth, and a second trough portion attached to said first wall portion and extending opposite the direction of airflow and toward the contoured portion of said header member, said first wall portion intercepting the moisture entrained in the airflow along the inside wall of said header member whereby said moisture will be collected by said second trough portion;

said water collection means further including a drain portion extending along the lowest point of said header member, the water collected by said trough portion flowing into said drain portion; and a drain tube connected to said header member adjacent said drain portion for removing said collected water from said drain portion.

6. A water collector as in claim 5 in which the trough portion of said scupper extends along the length of said core whereby said drain portion is formed between the extension of said trough portion and said header member.

7. A water collector as in claim 5 in which said trough portion has a raised lip at the innermost end thereof.

8. A water collector as in claim 5 and including airflow passage means in said trough portion.

9. A water collector as in claim 8 in which said airflow passage means includes holes having raised edges surounding said holes.

10. A water collector as in claim 8 in which said airflow passage means includes louver-type openings.

* * * * *